Nov. 25, 1952 J. P. CARROLL ET AL 2,619,219
CONVEYER WITH ADJUSTABLE HOPPER
Filed May 23, 1950 2 SHEETS—SHEET 1
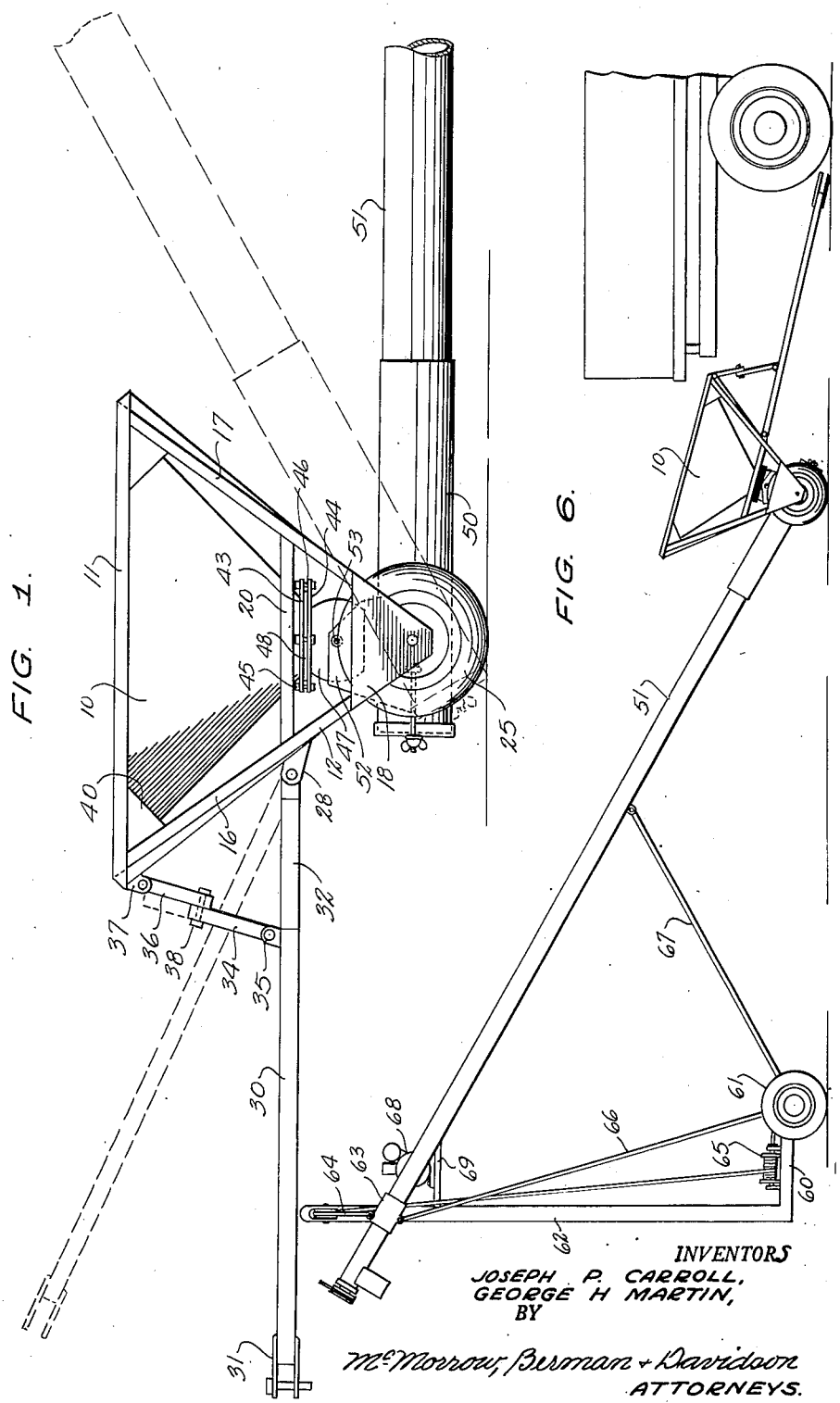
INVENTORS
JOSEPH P. CARROLL,
GEORGE H. MARTIN,
BY
McMorrow, Berman & Davidson
ATTORNEYS.

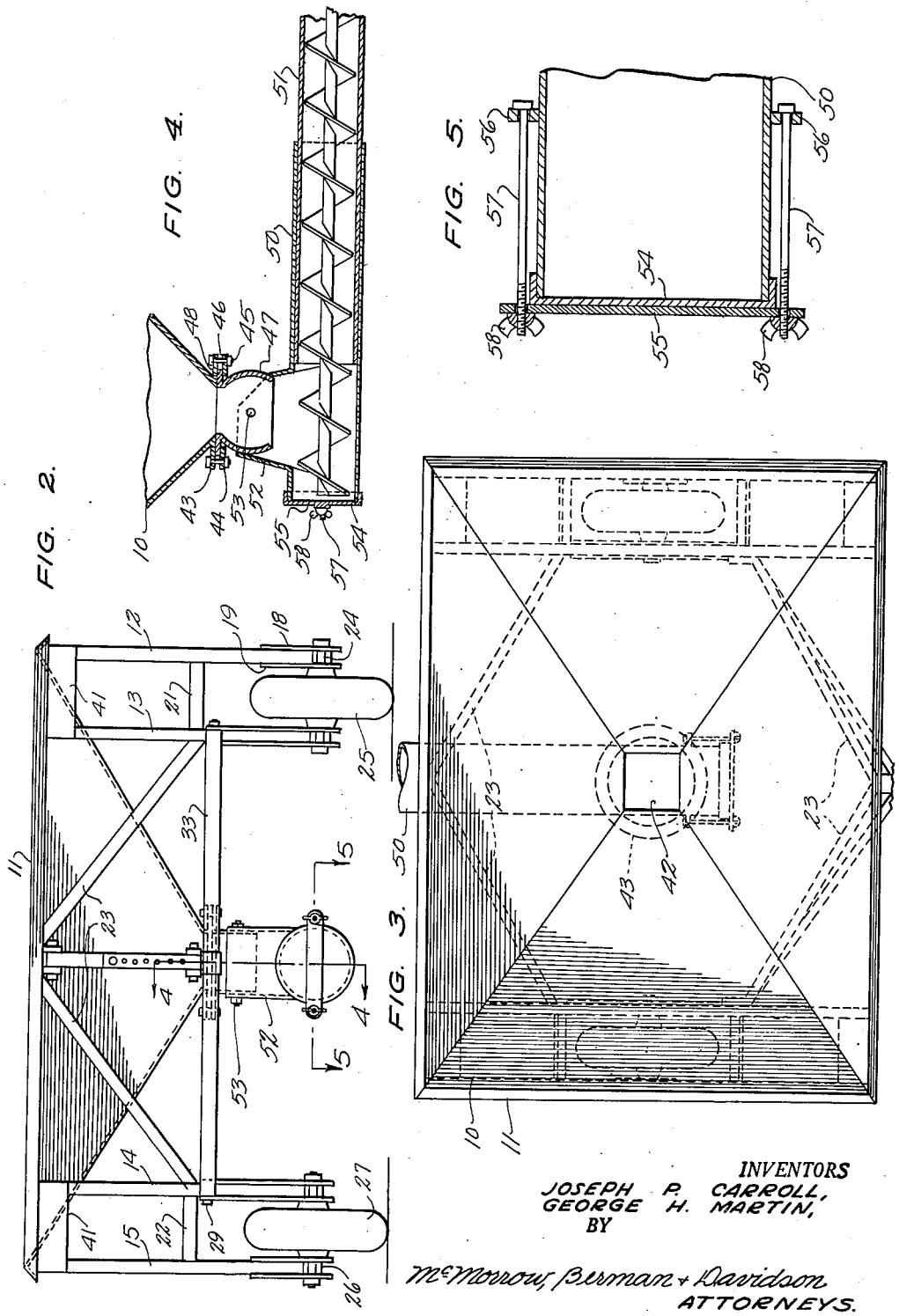

Patented Nov. 25, 1952

2,619,219

UNITED STATES PATENT OFFICE 2,619,219

CONVEYER WITH ADJUSTABLE HOPPER

Joseph P. Carroll and George H. Martin, Lakin, Kans.

Application May 23, 1950, Serial No. 163,648

2 Claims. (Cl. 198—53)

This invention relates to conveyor assemblies, and more particularly to a conveyor assembly for moving bulk material, such as grain, from a truck or wagon to a storage space, such as a grain bin, and for similar purposes.

It is among the objects of the invention to provide an improved conveyor assembly including a readily portable, wheel mounted hopper which can be easily positioned to receive grain from a dump truck body and can be adjustably tilted to properly position the hopper relative to the truck body, which also includes a boot or receiver for a screw conveyor, which boot or receiver is connected to the bottom of the hopper by a universal joint connection so that the screw conveyor can be placed in various positions of inclination, both vertically and horizontally, relative to the hopper to permit placing the hopper in proper position relative to a truck body to receive grain therefrom and extending the screw conveyor from the hopper to a grain storage space, for example, through a conveyor opening or window provided in the wall of a granary building, which conveyor assembly renders it unnecessary to provide a special pit to receive the intake end of the screw conveyor and prevents waste and spilling of the grain, protects the screw conveyor from damage, and may be used, with the boot or receiver removed, as a trailer for transporting bulk material.

Other objects and advantages will become apparent from a consideration of the following description and the appended claims in conjunction with the accompanying drawings, wherein:

Figure 1 is a side elevational view of a conveyor assembly illustrative of the invention with a portion of the screw conveyor broken away and omitted;

Figure 2 is a rear elevational view of the conveyor assembly illustrated in Figure 1;

Figure 3 is a top plan view of the conveyor assembly illustrated in Figures 1 and 2;

Figure 4 is a longitudinal cross-sectional view on the line 4—4 of Figure 2;

Figure 5 is a cross-sectional view on an enlarged scale on the line 5—5 of Figure 2; and Figure 6 is a side elevational view of the complete conveyor assembly shown in operative association with a dump truck for conveying bulk material from the truck body to a storage space.

With continued reference to the drawings, the conveyor assembly includes a hopper 10 of inverted, pyramidal shape truncated at its apex end and having both ends open. A rectangular angle iron frame 11 surrounds and is secured to the upper, larger end of the hopper, and wheel frames are secured to and extend downwardly from the frame 11 for supporting the hopper on suitable wheels.

Each of the wheel frames comprises two V-shaped structures, the four structures being designated at 12, 13, 14 and 15 in Figure 2. The two structures 12 and 13 are both disposed at one side of the hopper and are disposed in substantially parallel relationship to each other and spaced apart a distance substantially equal to the hub length of a wheel associated therewith. The two frames 14 and 15 are disposed at the opposite side of the hopper in substantially parallel relationship to each other and are also spaced apart a distance substantially equal to the hub length of the associated wheel.

As the four frame structures 12, 13, 14 and 15 are substantially identical in construction, a detailed description of only one is considered sufficient for the purposes of the present disclosure, the frame 12 having been selected for detailed description. This frame comprises two upwardly diverging legs 16 and 17, preferably of angle iron, the lower ends of which are contiguous to each other and the upper ends of which are connected to the top frame 11 at corresponding corners of the latter. Two gusset plates 18 and 19, of triangular shape, are secured to the two legs 16 and 17 at the bottom end of the frame structure 12, the gusset plate 18 being disposed on the outside and the plate 19 on the inner side of the two legs 16 and 17.

The upper edges of the gusset plates 18 and 19 are substantially parallel to the corresponding member of the top frame 11, and a cross brace 20 extends between the legs 16 and 17 above the gusset plates 18 and 19 and is also substantially parallel to the corresponding member of the top frame. Struts or braces 21 extend between the corresponding legs of the two frame structures 12 and 13 at the respectively opposite ends of the cross-brace 20, and similar struts or braces 22 extend between the corresponding legs of the two frame structures 14 and 15 at the respectively opposite ends of the cross brace in the structure 15 corresponding to the cross brace 20 described above.

Suitable diagonal braces 23 extend from the mid-length locations of the end members of the rectangular top frame 11 to the adjacent legs of the inner wheel mounting frame structures 13 and 14 intermediate the length of such legs to firmly maintain the wheel carrying frames at the opposite sides of the hopper substantially perpendicular to the top frame 11.

The gusset plates 18 and 19 are provided near their lower ends with aligned apertures to receive a wheel axle 24, and the gusset plates on the frame structure 13 are provided with corresponding apertures for receiving the same axle. A rubber tired wheel 25 is journaled on the axle 24 and disposed between the frame structures 12 and 13. The gusset plates at the lower ends of the frame structures 14 and 15 are apertured to receive a wheel axle 26 and a rubber tired wheel 27 is journaled on the axle 26 between the frame structures 14 and 15. The two wheels 25 and 27 support the hopper so that the bottom end of the hopper is disposed above the ground a distance sufficient to permit a screw conveyor receiver being placed below the hopper between the wheels 25 and 27 and connected to the bottom end of the hopper by a universal joint connection.

A pair of parallel and spaced apart lugs 28 is secured to the outer side of one of the legs of the frame structure 13, and a similar pair of lugs is secured to the outer side of the corresponding leg of the frame structure 14, the lugs being secured to the frame legs intermediate the lengths of the latter and substantially at the level of the cross brace 20. These lugs are apertured near their outer ends to receive a tongue attaching bolt 29.

A tongue 30 is provided at its front end with a hitch clevice 31 and is provided at its rear end with a pair of arms 32 which diverge symmetrically in a direction away from the corresponding end of the tongue and are provided near their distal ends with apertures receiving the bolt 29, so that the bolt 29 pivotally connects the tongue to the hopper frame. The apertured end of each arm 32 is preferably disposed between the two lugs of the corresponding pair of lugs to definitely position the tongue arms relative to the frame, and the portion of the bolt 29 intermediate the inner lugs is preferably received in a spacer tube 33.

An arm 34 is pivotally connected at one end to the tongue 30, at the end of the latter from which the arms 32 diverge, by a pivotal connection 35, and a complementary arm 36 is pivotally connected to the corresponding end member of the upper frame 11 by a pivotal connection 37 located approximately at the mid-length location of the frame member. The arms 34 and 36 are provided respectively with series of spaced apart apertures extending longitudinally thereof, and a bolt 38 is extended through selected registering apertures in the two arms to adjustably connect the tongue to the upper frame of the hopper, so that the hopper can be tilted to various selected angles relative to the tongue.

The frame is further reinforced by suitable gusset plates 40 connected between the legs of the outer frame structures 12 and 15, and the corresponding side members of the top frame 11, and by gusset plates 41 connecting the legs at the opposite sides of the two frame structures 12 and 13 and at the two opposite sides of the frame structures 14 and 15, to render the wheel carrying frame structures more rigid and more rigidly connected to the top frame 11 of the hopper.

The opening 42 in the smaller, lower end of the pyramidal-shaped hopper is square or rectangular, as particularly shown in Figure 3, and a circular plate is secured to the outside of the hopper at the smaller end thereof and provided with a rectangular opening which registers with the bottom opening 42 in the hopper. The plate 43 is provided near its periphery with angularly spaced apart apertures, and a ring 44 of substantially the same outside diameter as the plate 43 and provided with corresponding, angularly spaced apart apertures is secured to the plate 43 by the bolts 45, spacing sleeves 46 surrounding the bolts between the plate 43 and the ring 44 to maintain the ring spaced from the plate. A hollow body 47 having partly circular end walls which are spaced apart and substantially parallel to each other and arcuately curved or partly cylindrical side walls joined at their ends to the end walls, is cut away on its top and bottom sides chordally of its side walls to provide two openings disposed one at the top and one at the bottom of the body. The top opening in the body is surrounded by a circular flange 48, which flange is received between the ring 44 and the plate 43, and is rotatable in the space between the ring and the plate relative to the hopper, so that the body 47 can turn about an axis which substantially coincides with the axis of the pyramidal hopper perpendicular to the plane of the larger end of the hopper.

An elongated tubular receiver 50, preferably of cylindrical shape and dimension to receive the intake end of a standard or conventional screw conveyor 51, is disposed immediately below the body 47 and is provided in its side wall with an opening which communicates with the bottom opening in the body 47. A socket structure 52 extends outwardly from the receiver 50 surrounding three sides of the intake opening in the receiver, and this socket structure receives the lower portion of the body 47. The side walls of the socket structure and the side walls of the body 47 are provided with registering apertures which receive pivot pins or bolts 53 by means of which the receiver 50 is pivotally connected to the body 47 for turning movement about an axis substantially perpendicular to the axis about which the body 47 turns relative to the hopper 10.

With this arrangement, when the hopper assembly is operatively positioned on its wheels, the receiver 50 can be swung relative to the hopper in both vertical and horizontal planes.

The inlet opening in the receiver 50 is located near one end of the receiver, and this end of the receiver is closed by a flanged cap 54, particularly illustrated in Figure 5. The cap 54 is held in closing position on the rear end of the receiver 50 by a cross bar 55 which extends diametrically of the cap 54 and is provided near each end with an aperture. Two apertured lugs 56 are secured to the receiver at diametrically opposite sides of the receiver and at a location spaced from the rear end of the receiver and bolts 57 extend respectively through the lugs 56 and through the apertures in the cross bar 55 and are provided with wing nuts 58 for clamping the cap onto the receiver.

The tubular receiver 50 is open at its other or front end and telescopically receives the intake end of the casing of the screw conveyor 51.

The screw conveyor comprises an elongated tubular casing having a spiral screw extending longitudinally through and rotatable therein. This screw conveyor is mounted on a truck 60 supported on wheels 61 and carrying an upstanding post 62. A collar 63 is secured on the conveyor casing near the outlet end of the screw conveyor, and this collar is connected by suitable tackle 64 to the upper end of the post 62 and to a winch 65 for raising and lowering the outlet end of the screw conveyor. Braces 66 and 67 are provided between the screw conveyor casing or housing and the truck 60 to firmly support the screw conveyor on the truck, and the screw or worm of the conveyor is driven by an engine 68 mounted on a platform 69 and carried by the post 62. As the construction of the screw conveyor itself is old and well known, a more detailed description of this device is considered unnecessary for the purposes of the present disclosure.

With the above-described construction, the screw conveyor 51 can be swung relative to the hopper 10 in both vertical and horizontal planes, so that the hopper can be properly aligned with the rear end of a truck body, and, at the same time, the discharge end of the screw conveyor can be inserted through a conveyor opening in a building wall. At the same time, the hopper 10 can be tilted to properly adjust the end of the hopper remote from the screw conveyor to the height of a vehicle body.

By removing the receiver 50 and placing a closure plate in the bottom of the hopper to close the opening 42 and connecting the tongue 30 to a suitable towing vehicle, the hopper assembly can be used as a trailer for conveying bulk material.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A conveyor assembly comprising a hopper of inverted pyramidal shape truncated at its apex, a frame secured to said hopper and extending therebelow, wheels journaled on said frame supporting said frame and said hopper, a screw conveyor receiver disposed below said hopper and comprising an elongated hollow body having one open end and its other end closed and having an intake opening in the side thereof adjacent its closed end, and means connecting said receiver to said hopper for swinging movement of said receiver in various directions relative to said hopper and with the intake opening in said receiver in communication with the interior of said hopper through the smaller end of the latter, said means connecting said receiver to said hopper comprising a circular plate secured to said hopper at the smaller end of the latter and provided with an opening registering with the opening in the smaller end of said hopper, a ring secured to said plate and spaced therefrom, a rounded hollow body having openings in respectively opposite sides thereof and having a flange surrounding one of said openings and rotatably received between said plate and said ring, a socket formation on said receiver receiving a portion of said hollow body around the other opening in the latter, and means pivotally connecting said socket formation to said hollow body, said receiver being pivotally movable relative to said hopper about axes disposed substantially perpendicular to each other.

2. A conveyor assembly comprising a hopper of inverted pyramidal shape truncated at its apex, a frame secured to said hopper and extending therebelow, wheels journaled on said frame supporting said frame and said hopper, a screw conveyor receiver disposed below said hopper and comprising an elongated hollow body having one open end and its other end closed and having an intake opening in the side thereof adjacent its closed end, and means connecting said receiver to said hopper for swinging movement of said receiver in various directions relative to said hopper and with the intake opening in said receiver in communication with the interior of said hopper through the smaller end of the latter, said means connecting said receiver to said hopper comprising a circular plate secured to said hopper at the smaller end of the latter and provided with an opening registering with the opening in the smaller end of said hopper, a ring secured to said plate and spaced therefrom, a rounded hollow body having openings in respectively opposite sides thereof and having a flange surrounding one of said openings and rotatably received between said plate and said ring, a socket formation on said receiver receiving a portion of said hollow body around the other opening in the latter, and means pivotally connecting said socket formation to said hollow body, said receiver being pivotally movable relative to said hopper about axes disposed substantially perpendicular to each other, and said receiver comprising an elongated tubular body of cylindrical shape and a closure cap detachably secured on one end of said body.

JOSEPH P. CARROLL.
GEORGE H. MARTIN.

REFERENCES CITED

The following references are of record in the file of this patent:

UNITED STATES PATENTS

| Number | Name | Date |
|---|---|---|
| 2,360,069 | Marvin | Oct. 10, 1944 |
| 2,490,971 | Lawson et al. | Dec. 13, 1949 |